3,181,231
MOLECULAR SIEVE-METAL AGGLOMERATES
AND THEIR PREPARATION
Donald W. Breck, Tonawanda, N.Y., assignor to Union
Carbide Corporation, a corporation of New York
No Drawing. Filed Aug. 6, 1963, Ser. No. 300,163
13 Claims. (Cl. 29—182.5)

This invention relates to novel agglomerates of zeolitic molecular sieve crystals and metal bodies, and to the preparation of such agglomerates.

Zeolitic molecular sieve crystals are ultrafine particles of less than 10 microns size and most commonly on the order of 2.5 microns size. Because of their small size, these materials may not be used in many systems. For example, if employed in fixed beds for fluid processing they are difficult to retain, cause excessively high pressure drop and restrict fluid throughputs to low values not feasible for large scale commercial operation. Also, molecular sieve crystals are too small for use in moving bed processes.

Because of these and other limitations, it is common practice to cement the small molecular sieve crystals together in shapes such as spheres, tablets, pellets, and layer-form, generally with the aid of a binding agent such as a clay mineral, organic resin, water glass and the like. Although the prior art has provided many cemented multicrystalline products, the uses are still limited by physical property deficiences of such products. For instance, the size of a fixed bed adsorption chamber is limited by the crushing strength of the bodies in the bottom of such chamber.

An object of this invention is to provide a multi-crystalline molecular sieve body having superior physical properties.

Another object is to provide a multicrystalline molecular sieve body having higher crush strength.

Additional objects will be apparent from the ensuing disclosure and the appended claims.

One embodiment of this invention contemplates an agglomerate comprising zeolitic molecular sieve crystals of less than 10 microns individual size and metal bodies having at least one dimension less than 50 microns, the ratio of the metal body size to the zeolitic molecular sieve crystal size being at least 5 to 1. The metal bodies are uniformly dispersed throughout the agglomerate in quantity sufficient to constitute between about 5 and 30% by weight of the agglomerate, and are sintered to the outer surface of the molecular sieve crystals. The metal should have a melting point over 300° C. and is employed primarily as a structural component in the multicrystalline agglomerate but probably also enters into the formation of a chemical bond with the molecular sieve crystals by virtue of the sintering.

In this novel agglomerate the relatively large metal bodies act as elongated surfaces or "bridges" for the relatively small molecular sieve crystals. In this manner, several crystals are sintered to each metal body and most of these crystals are in turn sintered to other metal bodies, thereby providing an agglomerate which is mechanically and chemically bonded together. As used herein, "sintering" refers to the coalescence of the metal bodies and molecular sieve zeolite crystals into one solid mass through heating to temperature above ambient but below the melting or fusion temperature of the metal. Sintering involves molecular migration of the metal and the rate of migration is a function of the vapor pressure of the metal involved. Higher temperatures provide higher rates of molecular migration. It is important to avoid heating the metal bodies to their melting point as melted bodies at least partially lose their integrity, thereby preventing the strong mechanical and thermal bond which gives the multicrystalline agglomerate its superior properties. Another reason why melting of the metal bodies should be avoided is that the flowing metal tends to block the uniformly sized small pores of the zeolite crystals and may even pass through the pores into the molecular sieve's three dimensional inner cagework. Since the pores and inner cagework are among those characteristics which give molecular sieves their unique properties, melting of the metal bodies tends to reduce the utility of the multi-crystalline agglomerate.

Among the metals suitable for use in the multicrystalline agglomerate are those of groups Ib, IIb, IIIa, IIIb, Va, Vb, VIb, VIIb, and VIII of the Periodic Table (Handbook of Chemistry and Physics, Thirty-Eighth Edition, page 394, Chemical Rubber Publishing Co. 1956). Silicon, germanium, lead and tellurium are also suitable. Exemplary metals include but are not limited to copper, silver and gold of group Ib, magnesium of group IIa, zinc of group IIb, boron and aluminum of group IIIa, yttrium of group IIIb, antimony of group Va, vanadium of group Vb, chromium of group VIb, manganese of group VIIb, and iron, nickel, platinum and palladium of group VIII. Mixtures and alloys of these metals may also be employed. Metals or alloys suitable for use in the polycrystalline agglomerate must have melting points above 300° C. This is because the molecular sieve usually contains water or other fluid in its internal cagework, and such materials must be removed by heating to temperatures as high as 300° C. before the agglomerate is suitable for most uses, e.g. as a selective adsorbent. As previously discussed, melting of the metal bodies must be avoided if the agglomerate is to retain the characteristic mechanical and chemical bonding.

The metal bodies must have at least one dimension less than 50 microns, as for example bodies sufficiently small to pass through a 325-mesh (44 microns width) U.S. Standard Screen. These metal bodies are consequently in the form of powder, and preferably as "bronze powders." This expression refers to metallic flake-type powders as manufactured by a stamping or milling process generally for use in the printing, painting and plastic arts. Alloys of aluminum and copper and alloys of copper with other metals for example zinc, silver and gold and the metals aluminum, copper, silver, and gold may all be formed into these bronze powders. Aluminum is preferred because of its light weight and low cost.

It has been previously indicated that the ratio of the metal body size to the zeolitic sieve crystal size must be at least 5 to 1. This size relationship is necessary so that the metal bodies may act as elongated surfaces for attachment by the zeolite crystals. For high strength, the sintering bond must be primarily between the metal bodies and the zeolite crystals although some degree of weaker crystal-to-crystal bonding also results from the sintering operation. If the size relationship were less than 5 to 1, a relatively large number of crystal-to-crystal bonds would result and the agglomerate would not possess its high strength characteristic.

Another essential characteristic of this invention is that the metal bodies be present in quantity sufficient to constitute between about 5 and 30% by weight of the agglomerate. If a smaller proportion of metal bodies are used, there will be an insufficient number of metal body-zeolite crystal bonds formed to provide the required high strength characteristic in the agglomerate. On the other hand, more than 30% by weight metal bodies is not necessary because the agglomerate is already sufficiently strong for all contemplated uses. Moreover, additional quantities of metal bodies increase both the weight and cost of the agglomerate for no justifiable reason.

Molecular sieve zeolites are metal aluminosilicates which exist in three-dimensional crystalline form. Only the crystalline zeolites having the basic formula:

$$M_{2/n}O:Al_2O_3:xSiO_2:yH_2O$$

where "M" represents an exchangeable cation and "n" its valence, are termed zeolitic molecular sieves. In general, a particular crystalline zeolite will have values for "x" and "y" that fall within a definite range.

In zeolitic molecular sieves there is a framework of silicon-oxygen and aluminum-oxygen tetrahedra which is honeycombed with relatively large cavities normally filled with water molecules. Uniformly sized pores in the outer surface of the molecular sieve connect with these cavities, and the sieve may be activated by heating to effect loss of the water by hydration. This dehydration results in a very large surface area within the inner cagework for adsorption of foreign molecules.

Adsorption by molecular sieves is limited to molecules having size and shape such as to permit entrance through the pores to the inner adsorption region or cavities, larger molecules being excluded.

Zeolitic molecular sieves occur in nature and also may be synthesized. Among the naturally occurring zeolitic molecular sieves are chabazite, erionite, mordenite and faujasite, these being adequately described in the chemical art. Synthetic zeolitic molecular sieves include zeolites A, D, L, R, S, T, X, and Y, as well as the mordenite-type material known commercially as Zeolon and described in Chemical and Engineering News, March 12, 1956, pages 52–54.

The pore size of the zeolitic molecular sieves may be varied by employing different metal cations. For example, sodium zeolite A has a pore size of about 4 Angstrom units whereas when calcium cations have been exchanged for at least about 40 percent of the sodium cations calcium zeolite A has a pore size of about 5 Angstrom units.

Zeolite A is a crystalline zeolitic molecular sieve which may be represented by the formula:

$$1.0 \pm 0.2 M_{2/n}O:Al_2O_3:1.85 \pm 0.5 SiO_2:yH_2O$$

wherein M represents a metal, $n$ is the valence of M, and $y$ may have any value up to about 6. The as-synthesized zeolite A contains primarily sodium ions and is designated sodium zeolite A, described in more detail in U.S. Patent No. 2,882,243, issued April 14, 1959.

Zeolite X is a synthetic crystalline zeolitic molecular sieve which may be represented by the formula:

$$0.9 \pm 0.2 M_{2/n}O:Al_2O_3:2.5 \pm 0.5 SiO_2:yH_2O$$

wherein M represents a metal, particularly alkali and alkaline earth metals, $n$ is the valence of M, and $y$ may have any value up to about 8, depending on the identity of M and the degree of hydration of the crystalline zeolite. Sodium zeolite X has an apparent pore size of about 10 Angstrom units. Zeolite X, its X-ray diffraction pattern, its properties, and methods for its preparation are described in detail in U.S. Patent No. 2,882,244, issued April 14, 1959.

Zeolite Y is described and claimed in U.S. patent application Serial No. 109,487, now Patent No. 3,130,007, filed May 12, 1961 in the name of D. W. Breck.

If desired, other agents may be included with the zeolitic molecular sieve crystals and metal bodies to form the multicrystalline agglomerate. For example, clay minerals, alkali metal silicates and organic casting resins are among material known to be useful. Also, conventional clay binders may be incorporated. They may be used in a plastic state allowing extrusion, molding or casting of the agglomerate into shapes or application as coatings followed by a drying or curing step. As previously indicated most end uses of the agglomerate require activation to remove water or other fluid from the internal pore system of the molecular sieve. In some instances the curing of the added binder or the heating of the pelleting mold may have accomplished this activation. Heating with a gaseous purge or vacuum is the usual activation procedure, but of course the temperature level must be below the melting point of the metal and also below the destruction temperature of the molecular sieve crystals.

This invention also contemplates a novel method of preparing a sintered agglomerate composed of zeolitic molecular sieve crystals and metal bodies. In this method a mixture of molecular sieve crystals of less than 10 microns individual size, and metal bodies having at least one dimension less than 50 microns constituting between about 5 and 30% by weight of the mixture is provided. The mixture is intimately blended and thereafter compacted under superatmospheric pressure and temperature above 100° C. but below the destruction temperature of the crystals and also below the fusion point of the metal bodies, thereby sintering the metal bodies to the zeolitic molecular sieve crystals.

Both composition and method of this invention will be more clearly understood from the following illustrative examples.

EXAMPLE I

A series of mixtures comprising sodium zeolite A powder of less than 10 microns individual particle size with various binding agents was prepared and blended and samples of each blend were placed in a pellet press and heated to 175° C. under 10,000 p.s.i. A portion of each sample was then activated by heating to 175° C., 500° C. or 600° C. for a period of 0–2 hours, depending on the desired temperature. The aluminum and zinc bonded agglomerates were sintered at temperatures below their respective melting points of 660° C. and 419° C. The agglomerates were tested for mechanical (crush) strength by applying force to the periphery by means of a plunger.

*Table A*

SODIUM ZEOLITE A AGGLOMERATES

| Bonding agents | Pressing temp., °C. | Activation temp., °C. | Agg. strength | Water stability | X-ray | Adsorption | |
|---|---|---|---|---|---|---|---|
| | | | | | | $H_2O$, 4.5 mm. Hg, 25° C. | $O_2$, 700 mm. Hg, −183° C. |
| 5% powdered aluminum | 175 | 175 | Good | Good | | 22.8 | 20.9 |
| 20% powdered aluminum | 175 | 175 | ___do___ | Very good | Unchanged | 19.8 | 18.5 |
| 5% asbestos | 175 | 175 | ___do___ | Poor | | | |
| 5% $CaSO_4$ | 175 | 175 | Fair | Fair | | | |
| 20% powdered mica | 175 | 175 | ___do___ | Poor | 50% intensity | | |
| 5% powdered aluminum | 175 | 600 | Good | Good | Unchanged | 22.8 | 19.8 |
| 20% powdered aluminum | 175 | 600 | ___do___ | ___do___ | ___do___ | 19.5 | 18.3 |
| 5% asbestos | 175 | 600 | Fair | Fair | | | |
| 5% $CaSO_4$ | 175 | 600 | ___do___ | ___do___ | | | |
| 5% powdered zinc | 175 | 175 | Good | Good | | | 22.8 |
| 20% powdered zinc | 175 | 175 | ___do___ | Fair | Unchanged | | |

NOTE.—The aluminum and zinc powder passed through a 325-mesh U.S. Standard Screen.

The X-ray pattern of these agglomerates was compared with the pattern for sodium zeolite A to discover any appreciable loss of crystallinity. The water stability of the agglomerates was investigated by immersion in a water bath and subsequent visual inspection for break-up. Certain of the activated agglomerates were also tested for water and oxygen adsorption capacity for an indication of their utility as an adsorbent material. The results of these tests are shown in foregoing Table A.

An inspection of the Table A data reveals that the powdered aluminum-bonded sodium zeolite 9 agglomerates and the powdered zinc-bonded sodium zeolite A agglomerates are superior to the agglomerates bonded with other materials, i.e. asbestos, $CaSO_4$, and powdered mica. For example, the agglomerates of this invention demonstrate good crush strength whereas several of the non-metal bonded agglomerates demonstrate only fair crush strength. The metal-bonded agglomerates in general demonstrate good water stability, unchanged X-ray patterns, and high adsorption capacities for water and oxygen.

EXAMPLE II

In another series of tests similar to those of Example I, the agglomerates were hot pressed at 175° C. and 10,000 p.s.i., and then heated to temperatures of 400–700° C. for activation. Strength of the resulting agglomerates was determined by a crushing strength hardness tester, calibrated in kilograms, higher numbers indicating harder material. The tester consisted of a fixed and a spring loaded mandrel between which the agglomerate was compressed. The spring was compressed by a screw against the spring loaded mandrel until the agglomerate was crushed. The results are tabulated in Table B.

Table B
HARDNESS OF ZEOLITE A AGGLOMERATES

| Crushing strength (kg.) | Binder | Adsorption (weight percent) | |
|---|---|---|---|
| | | $H_2O$, 4.5 mm., 25° C. | $O_2$, 700 mm., −183° C. |
| 7 | 5% $H_3BO_3$ | 21.1 | 17.3 |
| 7 | 20% $(M_2O)_2(SiO_2)_3$ | 22.3 | 27.5 |
| 7.5 | None | 25.6 | 24.4 |
| 7.5 | 20% kaolin | | |
| 9 | 20% $Na_2O$ | 22.3 | 18.8 |
| 9 | 20% synthetic analcite | 21.5 | 17.5 |
| 10 | 20% attapulgite | 21.8 | 22.5 |
| 11 | 5% aluminum (through 325-mesh screen). | 22.8 | 19.8 |

This table shows that the aluminum sintered-zeolite A agglomerate possesses the highest crush of all the composites tested. Furthermore, this outstanding physical characteristic was obtained with only 5% binder whereas the other relatively hard agglomerates contained 20% by weight binder. It will be apparent that the use of as little binder as necessary to achieve the desired hardness is preferred, both from the standpoints of binder cost and adsorptive capacity of the multicrystalline agglomerate. That is, the binder reduces adsorptive capacity of the agglomerate as compared to the powdered zeolitic molecular sieve since the binder itself is not usually an adsorbent.

EXAMPLE III

A series of mixtures comprising sodium zeolite X powder of less than 10 microns individual particle size with various binding agents was prepared and blended. Samples of each blend were placed in a pellet press and heated to 175° C. under 10,000 p.s.i. The resulting activated pellets were then tested for crush strength in the previously described apparatus. Water stability and X-ray pattern were also determined as in the previously described Examples I and II. The results of these tests are reported in Table C.

Table C
HARDNESS OF ZEOLITE X AGGLOMERATES

| Crush strength (kg.) | Binder | Water stability | X-ray |
|---|---|---|---|
| 6 | 5% $(MgO_2)_2(SiO_2)_3$ | Good | Unchanged. |
| 5 | 10% $(MgO_2)_2(SiO_2)_3$ | do | Do. |
| 5 | 20% $(MgO_2)_2(SiO_2)_3$ | do | Do. |
| 8 | 10% halloysite | do | Do. |
| 4 | 20% halloysite | do | Do. |
| 5 | 5% silica | do | Do. |
| 10 | 10% attapulgite | Very poor | Do. |
| 10 | 20% attapulgite | do | Do. |
| 11 | 10% $B_2O_3$ | Good | Intensity reduction. |
| 7 | 5% aluminum | do | Unchanged. |
| 10 | 10% aluminum | do | Do. |
| 10 | 20% aluminum | do | Do. |

NOTE.—The powdered aluminum passed through a 325-mesh U.S. Standard Screen.

An inspection of Table C reveals that the 10% and 20% aluminum sintered zeolite X agglomerates are superior to the other agglomerates in either or both crush strength and water stability.

EXAMPLE IV

Another series of tests were performed similar to those described in Example III, except that the blended samples were hot-pressed at 200° C. and 20,000 or 40,000 p.s.i. Also, the crushing strength was determined by two methods, the spring technique used in Examples I–III and a spring-rod arrangement. In the latter, a section of brass rod having a diameter approximately equal to that of the extruded pellets was inserted between a flat disk pellet and the crushing force so that the pellet area exposed to this force would be comparable with that of an extruded pellet. The results of these tests are reported in Table D.

Table D
HARDNESS OF ZEOLITE X AGGLOMERATES EXPOSED TO MORE STRINGENT PRESSING CONDITIONS

| Binder | Pressing conditions | | Crushing strength (kg.) | | Adsorption | |
|---|---|---|---|---|---|---|
| | Temp., °C. | Pressure, p.s.i.×10⁻⁴ | Spring | Spring plus rod | Kr, 18 mm.,−183° C. | $H_2O$, 4.5 mm., 25° C. |
| None | 200 | 2 | 10.5 | 3.5 | 70.2 | 29.7 |
| 20% $Na_2C$ | 200 | 2 | 10.5 | .5 | | |
| 20% $Na_2C$ | 200 | 4 | 10.5 | 3.5 | | |
| 20% synthetic analcite | 200 | 2 | 10.5 | 1.5 | | |
| 20% synthetic analcite | 200 | 4 | 10.5 | 1.5 | | |
| 10% $Na_2SiO_3$ | 200 | 2 | 10.5 | 1.5 | | |
| 10% $Na_2SiO_3$ | 200 | 4 | 10.5 | 7.5 | | |
| 10% albite | 200 | 2 | 10.5 | 2 | | |
| 10% albite | 200 | 4 | 10.5 | 2.5 | | |
| 5% talc | 200 | 2 | 10.5 | 1.5 | 64.0 | 28.8 |
| 5% talc | 200 | 4 | 10.5 | 5.5 | 54.7 | 25.0 |
| 20% Al | 200 | 2 | 10.5 | 10 | 50.5 | 22.9 |
| 20% Al | 200 | 4 | 10.5 | 10 | 44.7 | 20.9 |
| 10% MgSiO | 200 | 2 | 10.5 | 5.5 | 57.1 | 25.8 |
| 10% MgSiO | 200 | 4 | 10.5 | 5.5 | 57.9 | 25.4 |

An inspection of Table D reveals that the aluminum-sintered agglomerates again exhibit far higher crush strength than the other agglomerates.

Although particular embodiments of this invention have been described in detail, it is contemplated that modifications of the composition and method may be made and that some features may be employed without others, all within the scope of the invention. For example, the agglomerate used need not be in the form of a pellet, but may be prepared in any desired shape, as for example a coating on a wall or an extruded rod.

What is claimed is:

1. An agglomerate comprising zeolitic molecular sieve crystals of less than 10 microns individual size, and metal bodies having at least one dimension less than 50 microns, the ratio of the metal body size to the zeolitic molecular sieve crystal size being at least 5 to 1, said metal bodies having a melting point over 300° C., being uniformly dispersed throughout the agglomerate in quantity sufficient to constitute between about 5 and 30% by weight of the agglomerate and sintered to the outer surface of the molecular sieve crystals.

2. An agglomerate according to claim 1 in which said metal bodies are a flake-type powder.

3. An agglomerate according to claim 1 in which said metal bodies are a member selected for the group consisting of groups I$b$, II$a$, II$b$, III$a$, III$b$, V$a$, V$b$, VI$b$, VII$b$ and VIII of the Periodic Table, silicon, germanium, lead and tellurium.

4. An agglomerate according to claim 1 in which said metal bodies are aluminum flakes.

5. An agglomerate according to claim 1 in which the molecular sieve crystals are zeolite A.

6. An agglomerate according to claim 1 in which the molecular sieve crystals are zeolite X.

7. An agglomerate according to claim 1 in which the molecular sieve crystals are zeolite A and the metal bodies are aluminum flakes.

8. An agglomerate according to claim 1 in which the molecular sieve crystals are zeolite X and the metal bodies are aluminum flakes.

9. An agglomerate according to claim 1 containing a clay binder material.

10. The method of preparing a sintered agglomerate composed of zeolitic molecular sieve crystals and metal bodies, comprising the steps of providing a mixture of said crystals of less than 10 microns individual size, and said metal bodies, constituting between about 5 and 30% by weight of the mixture and having a melting point over 300° C., and at least one dimension less than 50 microns, the ratio of the metal body size to the zeolitic molecular sieve crystal size being at least 5 to 1; intimately blending said mixture; and thereafter compacting the blended mixture under superatmospheric pressure and temperature above 100° C. but below the destruction temperature of said crystals and also below the fusion point of said metal bodies thereby sintering said bodies to the zeolitic molecular sieve crystals.

11. The method according to claim 10 in which the molecular sieve is zeolite A and the metal bodies are aluminum flakes.

12. The method according to claim 10 in which the molecular sieve is zeolite X and the metal bodies are aluminum flakes.

13. The method according to claim 10 in which the sintered agglomerate is heated to temperature below 300° C. for activation of the molecular sieve.

References Cited by the Examiner
UNITED STATES PATENTS

| | | | |
|---|---|---|---|
| 2,834,429 | 5/58 | Kinsella et al. | 55—75 |
| 2,952,630 | 9/60 | Eggertsen et al. | 210—24 |
| 3,001,607 | 9/61 | Eng et al. | 55—75 |

FOREIGN PATENTS 360,736  11/31  Great Britain.

CARL D. QUARFORTH, *Primary Examiner.*